United States Patent Office 3,158,625
Patented Nov. 24, 1964

3,158,625
20-(LOWER ALIPHATIC HYDROCARBON)-
Δ[17(20)]-PREGNEN-21-OIC ACIDS
Albert Bowers and Pierre Crabbé, Mexico City, Mexico, assignors to Syntex Corporation, Panama, Panama, a corporation of Panama
No Drawing. Filed June 17, 1963, Ser. No. 288,497
20 Claims. (Cl. 260—397.1)

This invention relates to novel cyclopentanopolyhydrophenanthrene derivatives and to processes for their preparation. More particularly, this invention relates to novel 20-(lower aliphatic hydrocarbon)-Δ[17(20)]-pregnen-21-oic acids and derivatives thereof represented by the general formulas:

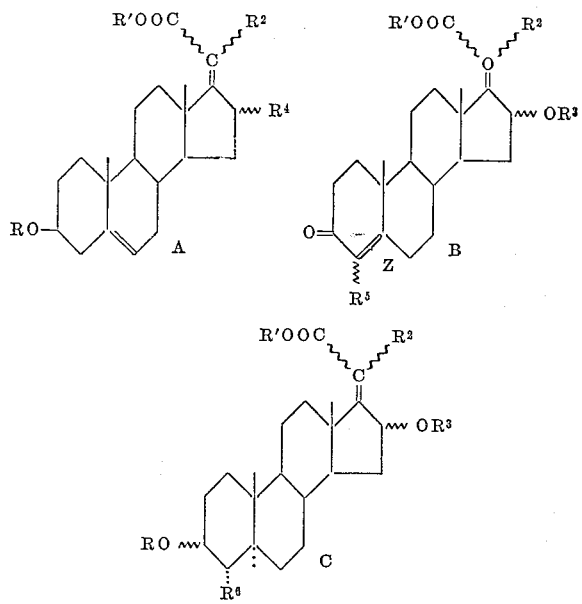

In these formulas, R and $R^3$ each represent hydrogen or an acyl group of less than 12 carbon atoms; $R^1$ represents hydrogen, a lower alkyl group, e.g., methyl, ethyl, propyl, and the like, and especially methyl, or an alkali metal, e.g., lithium, sodium or potassium; $R^2$ represents a saturated or unsaturated, straight or branched-chain aliphatic hydrocarbon radical containing 1 to 8 carbon atoms, inclusive, such as methyl, ethyl, propyl, isopropyl, butyl, isohexyl (4-methylpentyl), 3,4-dimethylpentyl, 3-ethyl-4-methylpentyl, vinyl, isohexenyl(4-methylpent-3-enyl), and the like; $R^4$ represents α-hydroxyl- β-hydroxyl, their tetrahydropyranyl ethers, or a keto group; $R^5$ represents hydrogen or a lower alkyl group, especially methyl; $R^6$ represents a lower alkyl group, particularly methyl, and Z represents a saturated linkage (single bond) or a double bond at the 4,5-position.

Wherever used, the symbol ξ indicates that singly bonded substituents at the 3-, 4- and 16-positions of the steroid nucleus can be present in either the α or the β-configuration, while substituents at the 20-position can be either cis- or trans[20(cis) or 20(trans)] with respect to the methyl group in the 18-position.

The novel 20-(lower aliphatic hydrocarbon)-Δ[17(20)]-pregnen-21-oic acids and derivatives thereof represented by formulas A, B and C above are antibiotic agents, and more particularly antibacterial and antifungal agents having good systemic activity when administered orally or parenterally. They also have good antibiotic activity when applied topically.

The compounds of the present invention can be prepared by processes which can be depicted as follows:

The acyl and acyloxy groups referred to herein are derived from hydrocarbon carboxylic acids containing less than 12 carbon atoms which may be saturated or unsaturated, of straight, branched, cyclic or cyclic-aliphatic chain, or aromatic, and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentyl propionate, aminoacetate, and β-chloropropionate.

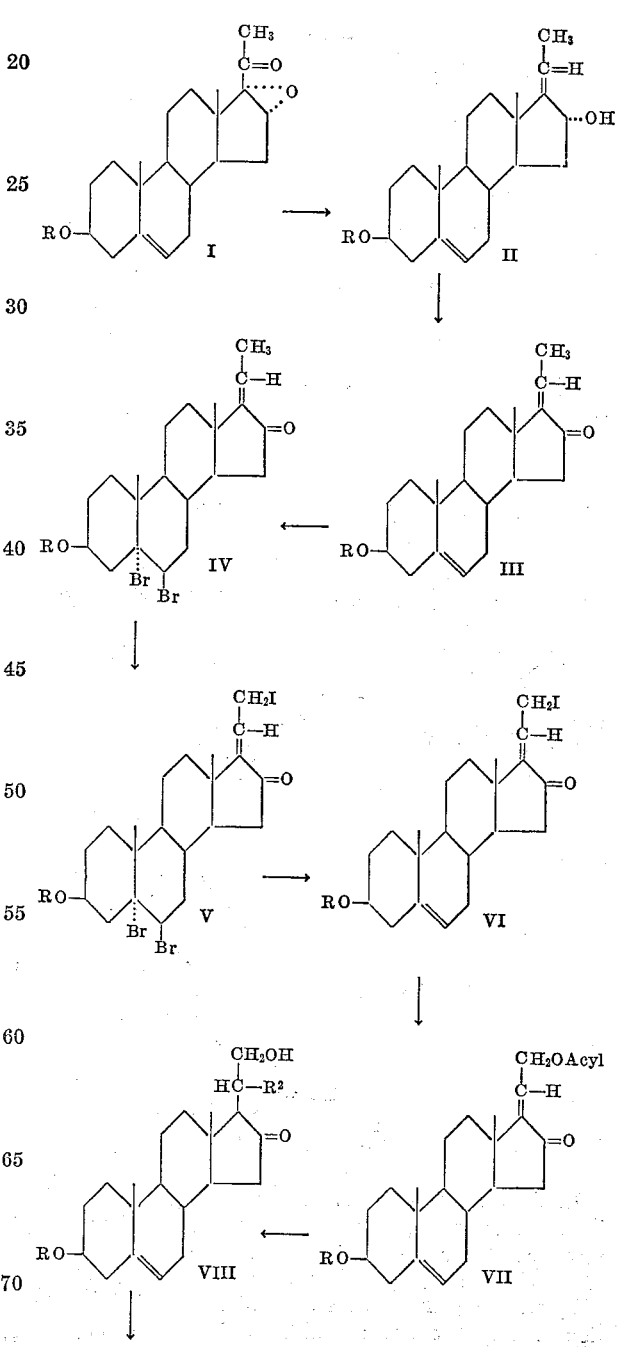

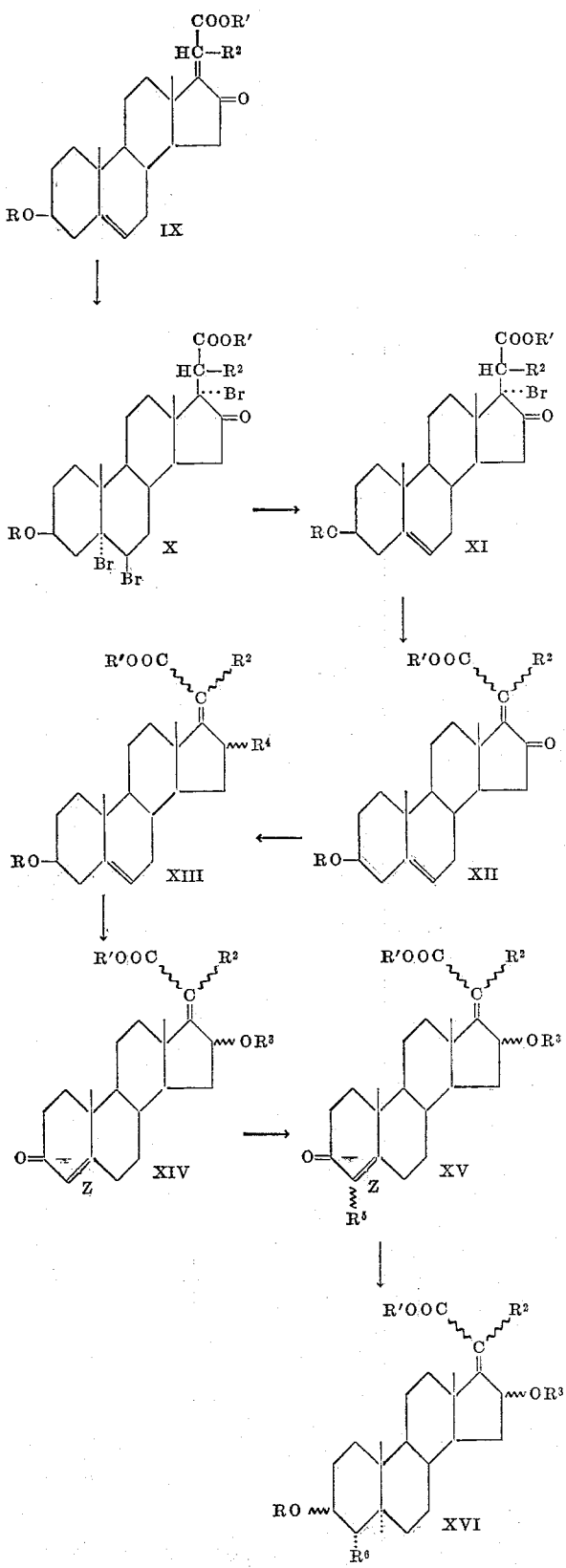

In these formulas R, R¹, R², R³, R⁴, R⁵, R⁶ and Z have the same meaning as set forth hereinabove for formulas A, B and C, with the exception that in certain cases R³ can also represent a tetrahydropyranyl radical.

In practicing the process outlined in the above reaction scheme, the starting material, 16α, 17α-epoxy-Δ⁵-pregnen-3β-ol-20-one (I; R=H), or a 3-acylate, e.g., the 3-acetate, thereof (I; R=acyl), is treated according to the Huang-Minlon modification of the Wolff-Kishner method, i.e., with hydrazine hydrate in the presence of potassium hydroxide in ethylene glycol-water suspension, to produce the corresponding Δ⁵,¹⁷⁽²⁰⁾-pregnadiene-3β, 16α-diol or the 3-acylate thereof (II). This reaction is preferably carried out at reflux temperature for about 45 minutes and then at 200° C. for about 2 hours, but it can also be carried out at room temperature by using hydrazine hydrate together with acetic acid, preferably in the presence of a lower alkanol, e.g., ethanol.

Treatment of the thus obtained Δ⁵,¹⁷⁽²⁰⁾-pregnadiene (II) with manganese dioxide or 2,3-dichloro-5,6-dicyano-Δ¹,⁴-benzoquinone, preferably in an inert organic solvent such as chloroform, dioxane, or the like, generally at room temperature for about 18 hours, results in the corresponding Δ⁵,¹⁷⁽²⁰⁾-pregnadien-3β-ol-16-one or its 3-acylate (III).

This 16-one (III) is then reacted with approximately 1 molar equivalent of bromine, preferably in the presence of a catalytic amount of an amine, such as pyridine and the like, to give the corresponding 5α,6β-dibromo derivative (IV) which is then treated with approximately 1 molar equivalent of N-iodosuccinimide, under conventional conditions, to produce the corresponding 5α,6β-dibromo-21-iodo derivative (V). This 21-iodo derivative (V) is then treated with sodium iodide, under conventional conditions, to remove the bromine from the 5- and 6-positions, thus restoring the 5,6-double bond and resulting in the formation of the corresponding Δ⁵-21-iodo derivative (VI), which in turn is treated with a potassium acylate, e.g., potassium acetate, preferably in acetone at reflux temperature, to yield the corresponding Δ⁵,¹⁷⁽²⁰⁾-pregnadiene-3β,21-diol-16-one 21-acylate or the corresponding 3,21-diacylate (VII).

The 21-acylate or the 3,21-diacylate (VII), upon treatment with approximately 3 molar equivalents of a lower aliphatic hydrocarbon magnesium halide wherein the lower aliphatic hydrocarbon moiety contains from 1 to 8 carbon atoms, inclusive, e.g., methyl magnesium bromide, affords the corresponding 20-(lower aliphatic hydrocarbon)-Δ⁵-pregnene-3β,21-diol-16-one (VIII; R=H). This reaction is carried out in the presence of cuprous chloride, preferably using tetrahydrofuran as a solvent and reacting at a temperature of about 28° C. for about 2 hours. The 3-hydroxy group of the resulting 3β,21-diol (VIII; R=H) is then selectively acylated by first treating the diol with triphenylmethyl chloride, using conventional conditions, reacting the resulting 21-triphenylmethyl ether with a carboxylic acid anhydride, e.g., acetic anhydride, and finally hydrolyzing the 21-triphenylmethyl ether group, preferably under acidic conditions, e.g., using hydrogen bromide in acetic acid.

The thus obtained 3-acylate (VIII; R=acyl), is then oxidized, preferably with Jones' reagent at room temperature, using an amount of the reagent sufficient to permit the color thereof to persist in the reaction mixture at least 10 minutes, to produce the corresponding 3-acylate of the 20-(lower aliphatic hydrocarbon)-Δ⁵-pregnen-3β-ol-16-one-21-oic acid (IX; R=acyl, R¹=H). This 21-oic acid is reacted with a diazo(lower) alkane, e.g., diazomethane, preferably in methanol at room temperature for about 10 minutes, to yield the corresponding 21-oic acid lower alkyl ester (IX; R=acyl, R¹=lower alkyl). Bromination of this 21-oic acid lower alkyl ester with approximately one and one-half molar equivalents of bromine, preferably in the presence of hydrogen bromide, yields the corresponding 5α,6β,17α-tribromide (X; R=acyl; R¹=lower alkyl) which, upon treatment with an excess of sodium iodide at reflux temperature, preferably using methyl ethyl ketone as a solvent, results in the corresponding 3-acylate of the 20-(lower aliphatic hydrocarbon)-17α-bromo-Δ⁵-pregnen-3β-ol-16-one-21-oic acid lower alkyl ester (XI; R=acyl, $R^1$=lower alkyl). This 17α-bromo derivative in dehydrobrominated, preferably using calcium chloride in dimethylformamide at reflux temperature for about 45 minutes, following which the resulting product is chromatographed to separate the 3-acylates of the 20[cis]-(lower aliphatic hydrocarbon)-$\Delta^{5,17(20)}$-pregnadien-3β-ol-16-one-21-oic acid lower alkyl ester and the corresponding 20 [trans] derivative (XII; R=acyl, $R^1$=lower alkyl).

Reduction of these 20[cis]- and [trans]-derivatives (XII) with a double metal hydride, e.g., sodium borohydride, preferably in a water-free methanol-tetrahydrofuran solution, followed by chromatographic separation, yields the 3-acylates of the corresponding 20[cis]- and 20[trans]-(lower aliphatic hydrocarbon)-$\Delta^{5,17(20)}$-pregnadiene-3β,16α-diol-21-oic acid lower alkyl esters and their 16β-hydroxy isomers (XIII; R=acyl, $R^1$=lower alkyl, $R^4$=OH). Treatment of these 16-hydroxy derivatives with dihydropyrane in the presence of p-toluenesulfonic acid, e.g., at room temperature for 4 days, affords the corresponding 16-tetrahydropyranyloxy derivatives (XIII; R=acyl, $R^1$=lower alkyl, $R^4$=tetrahydropyranyloxy). Conventional saponification of these 16-tetrahydropyranyloxy derivatives results in the corresponding 16-tetrahydropyranyl ethers of the 20[cis]- and 20[trans]-(lower aliphatic hydrocarbon)-$\Delta^{5,17,20}$-pregnadiene-3β,16α-diol-21-oic acids and their 16β-hydroxy isomers (XIII; R=H, $R^1$=H, $R^4$=tetrahydropyranyloxy).

Treatment of the thus obtained 3β,16α- and 16β-diols under conventional Oppenauer oxidation conditions results in the corresponding $\Delta^4$-3-keto derivatives (XIV; $R^1$=H, $R^3$=tetrahydropyranyl, Z=a double bond). Conventional acid hydrolysis of these $\Delta^4$-3-keto-16-tetrahydropyranyloxy derivatives yields the corresponding $\Delta^4$-3-keto-16α- and 16β-hydroxy derivatives (XIV; $R^1$=H, $R^3$=H, Z=a double bond). These $\Delta^4$-3-keto-16-hydroxy derivatives, when treated with a lower alkyl iodide, e.g., methyl iodide, in the presence of potassium t-butoxide in solution in t-butanol, preferably at reflux temperature for about 3 hours, yield the corresponding 4-lower alkyl-16-hydroxy-$\Delta^4$-3-keto derivatives (XV; $R^1$=H, $R^3$=H, $R^5$=lower alkyl, Z=a double bond). Hydrogenation of these 4-lower alkyl-16-hydroxy-$\Delta^4$-3-keto derivatives with approximately 1 molar equivalent of hydrogen, preferably using a 5% palladium-on-charcoal catalyst, affords the corresponding 4β-lower alkyl-20[cis]- and 20[trans]-(lower aliphatic hydrocarbon)-$\Delta^{17(20)}$-allopregnen-16-ol-3-one-21-oic acids (XV; $R^1$=H, $R^3$=H, $R^5$=lower alkyl, Z= a saturated linkage), which, in turn, give the corresponding 4α-lower alkyl isomers when treated with a base, e.g., sodium hydroxide, under conventional conditions.

Reduction of the thus obtained 4α-lower alkyl isomers with a double metal hydride, e.g., sodium borohydride, results in the corresponding 4α-lower alkyl-20[cis]- and 20[trans]-(lower aliphatic hydrocarbon)$\Delta^{17(20)}$-pregnene-3β,16-diol-21-oic acids (XVI; R=H, $R^1$=H, $R^3$=H, $R^6$=lower alkyl). Reduction of the same 4α-lower alkyl isomers with non-pyrophoric Raney nickel rather than a double metal hydride, preferably in ethanol at reflux temperature for about 5 hours, results in the corresponding 4α-lower alkyl-20[cis]- and 20[trans]-(lower aliphatic hydrocarbon)-$\Delta^{17(20)}$-pregnene-3α,16-diol-21-oic acids (XVI; R=H, $R^1$=H, $R^3$=H, $R^6$=lower alkyl).

The novel 20-(lower aliphatic hydrocarbon)-$\Delta^{17(20)}$-pregnen-21-oic acids and derivatives thereof of the present invention having a free secondary hydroxyl group, e.g., at the 3- or the 16-position, can be acetylated by conventional methods, e.g., by using a suitable acylating agent, such as a carboxylic acid, or a chloride or anhydride thereof, of the type mentioned hereinabove, in the presence of pyridine.

Similarly, the compounds of the present invention having a free carboxyl group attached to the carbon atom at the 20-position, e.g., compounds XII–XVI, inclusive, as shown hereinabove, wherein $R^1$=H can be converted to the corresponding 21-oic acid lower alkyl esters by conventional esterification with a diazo (lower) alkane, e.g., diazomethane and the like. The free carboxyl compounds of the present invention can also be converted to the corresponding alkali metal salt derivatives by reaction with approximately 1 molar equivalent of an alkali metal hydroxide, e.g., sodium or potassium hydroxide, under conventional conditions.

Treatment of the $\Delta^4$-3-keto derivatives of the present invention, i.e., compounds XIV and XV as shown hereinabove, with approximately 1 molar equivalent of hydrogen, preferably using a hydrogenation catalyst such as 5% palladium-on-charcoal, affords the corresponding 3-keto-5α-compounds (XIV and XV; Z=saturated linkage).

The following working examples serve to illustrate, but are not intended to limit the scope of the present invention:

Example I

A mixture of 1 g. of the known 16α,17α-epoxy-$\Delta^5$-pregnen-3β-ol-20-one, 2 g. of hydrazine hydrate, 1.0 cc. of acetic acid and 10 cc. of ethanol were stirred at room temperature for 30 minutes. Then water was added and the product isolated by extraction with methylene chloride. Recrystallization of the residue obtained after evaporation of the solvent from acetone-hexane afforded $\Delta^{5,17(20)}$-pregnadiene-3β,16α-diol (Compound No. 1).

Example II 1 g. of Compound No. 1 in 100 cc. of chloroform, distilled from calcium chloride, was oxidized by stirring for 18 hours at room temperature with 10 g. of freshly precipitated manganese dioxide. The inorganic material was filtered, washed with hot chloroform and the solution evaporated. Recrystallization from acetone-hexane gave $\Delta^{5,17(20)}$-pregnadien-3β-ol-16-one (Cpd. No. 2).

Example III

A solution of 8 g. of Cpd. No. 2 in 100 cc. of chloroform containing a few drops of pyridine was cooled to 0° C. and slowly treated under stirring with a cooled solution of bromine in chloroform containing 1.05 molar equivalents of bromine. The mixture was allowed to reach room temperature, the excess of bromine was removed by flushing with dry air and the solution was washed with 5% aqueous sodium bicarbonate solution and subsequently with water, dried over anhydrous sodium sulfate and evaporated to dryness. Crystallization of the residue from methanolbenzene afforded 5α,6β-dibromo-$\Delta^{17(20)}$-pregnen-3β-ol-16-one. 4.2 g. of the latter compound in 200 cc. of carbon tetrachloride was refluxed with 2.7 g. of N-iodo-succinimide for 1½ hours. The mixture was filtered to eliminate the succinimide that is formed during the reaction. The filtrate was evaporated to dryness under reduced pressure. Recrystallization from methylene-chloride-hexane gave 5α,6β-dibromo-21-iodo-$\Delta^{17(20)}$-pregnadien-3β-ol-16-one.

A mixture of 2 g. of the latter compound, 2 g. of sodium iodide and 50 cc. of methyl ethyl ketone was refluxed for 8 hours. It was then cooled, poured into water and extracted with ethyl acetate. The organic extract was washed with aqueous sodium bisulfite solution, water, dried over anhydrous sodium sulfate and evaporated to dryness. Crystallization of the residue from acetone-hexane yielded 21-iodo-$\Delta^{5,17(20)}$-pregnadien-3β-ol-16-one (Cpd. No. 3). This compound was mixed with 80 cc. of acetone and 12 g. of recently fused potassium acetate and the mixture was refluxed for 8 hours, concentrated to a small volume, diluted with water and extracted with ethyl acetate; the extract was washed with water, dried over anhydrous sodium sulfate and concentrated until crystallization started. The precipitate was collected and crystallized from methanol-water, thus yielding $\Delta^{5,17(20)}$-pregnadiene-3β,21-diol-16-one 21-acetate (Cpd. No. 4).

Example IV

To a mixture of 1 g. of $\Delta^{5,17(20)}$-pregnadiene-3β,21-diol- 16-one 21-acetate (Cpd. No. 4), 1 g. of cuprous chloride and 30 cc. of anhydrous tetrahydrofuran was added, while stirring and cooling, 30 cc. of tetrahydrofuran, containing 3 mol. equiv. of methyl magnesium bromide.

The mixture was stirred for 2 hours at 28° C., then poured into ice-water, containing dilute hydrochloric acid. The product was extracted with methylene chloride, the extract washed to neutral with water and dried over anhydrous sodium sulfate. Evaporation of the solvent at reduced pressure gave a residue, which was purified by crystallization from methylene chloride-hexane to afford 20-methyl-$\Delta^5$-pregnene-3$\beta$,21-diol-16-one (Cpd. No. 5).

*Example V*

The Compound No. 4 was treated according to Example IV, except that methyl magnesium bromide was substituted by ethyl magnesium bromide, vinyl magnesium bromide, isohexyl magnesium bromide and 4-methyl-pent-3-enyl magnesium bromide thus yielding respectively:

Cpd. No.:

(6) 20-ethyl-$\Delta^5$-pregnene-3$\beta$,21-diol-16-one,
(7) 20-vinyl-$\Delta^5$-pregnene-3$\beta$,21-diol-16-one,
(8) 20-isohexyl-$\Delta^5$-pregnene-3$\beta$,21-diol-16-one,
(9) 20-(4'-methyl-pent-3'-enyl)-$\Delta^5$-pregnene-3$\beta$,21-diol-16-one.

*Example VI*

A mixture of 1 g. of Compound No. 5, 3 g. of triphenylmethyl chloride and 15 cc. of pyridine was heated on a steam bath for 2 hours, then it was cooled to 5° C. and 2 cc. of acetic anhydride were added. The resulting mixture was kept at the same temperature for 24 hours, then it was poured into ice-water and the resulting precipitate collected by filtration and dried. The dry solid was mixed thoroughly with 20 cc. of acetic acid and there were added 3 cc. of a saturated solution of hydrogen bromide in acetic acid. The resulting mixture was stirred for 3 minutes, then poured into ice water and the formed precipitate collected by filtration, washed with water, dried and crystallized from acetone-hexane, thus yielding 20-methyl-$\Delta^5$-pregnene-3$\beta$,21-diol-16-one 3-acetate (Cpd. No. 10).

The Compounds Nos. 6 to 9, inclusive, were treated by the same procedure, thus affording respectively:

Cpd. No.:

(11) 20-ethyl-$\Delta^5$-pregnene-3$\beta$,21-diol-16-one 3-acetate,
(12) 20-vinyl-$\Delta^5$-pregnene-3$\beta$,21-diol-16-one 3-acetate,
(13) 20-isohexyl-$\Delta^5$-pregnene-3$\beta$,21-diol-16-one 3-acetate,
(14) 20-(4'-methyl-pent-3'-enyl)-$\Delta^5$-pregnene-3$\beta$,21-diol-16-one 3-acetate.

*Example VII*

A solution of 1 g. of Compound No. 10 in 10 cc. of acetone was cooled to 0° C. and treated under an atmosphere of nitrogen and with stirring, with a solution of 8 N chromic acid (prepared by mixing 26 g. of chromium trioxide with 23 cc. of concentrated sulfuric acid and diluting with water to 100 cc.), until the color of the reagent persisted in the mixture for 10 minutes. It was stirred for 5 minutes further at 0–5° C. and diluted with water. The precipitate was collected, washed with water and dried under vacuum, thus affording a crude product which upon recrystallization from acetone-hexane gave the 3-acetate of 20-methyl-$\Delta^5$-pregnen-3$\beta$-ol-16-one-21-oic acid (Cpd. No. 15).

The Compounds Nos. 11 to 14, inclusive, were treated following the latter procedure, thus furnishing respectively:

Cpd. No.:

(16) The 3-acetate of 20-ethyl-$\Delta^5$-pregnen-3$\beta$-ol-16-one-21-oic acid,
(17) The 3-acetate of 20-vinyl-$\Delta^5$-pregnen-3$\beta$-ol-16-one-21-oic acid,
(18) The 3-acetate of 20-isohexyl-$\Delta^5$-pregnen-3$\beta$-ol-16-one 21-oic acid,
(19) The 3-acetate of 20-(4'-methyl-pent-3'-enyl)-$\Delta^5$-pregnen-3$\beta$-ol-16-one-21-oic acid.

*Example VIII*

To a mixture of 1 g. of Compound No. 15 and 50 cc. of methanol was added an ether solution of diazomethane, containing 500 mg. of the latter. The resulting mixture was kept at room temperature for ten minutes, then it was treated with a few drops of acetic acid to decompose the excess reagent, and evaporated to dryness. The residue was crystallized from acetone-hexane, thus yielding the 3-acetate of the 20-methyl-$\Delta^5$-pregnen-3$\beta$-ol-16-one-21-oic acid methyl ester (Cpd. No. 20).

The Compounds Nos. 16 to 19, inclusive, were treated following the same procedure thus affording respectively:

Cpd. No.:

(21) The 3-acetate of the 20-ethyl-$\Delta^5$-pregnen-3$\beta$-ol-16-one-21-oic acid methyl ester,
(22) The 3-acetate of the 20-vinyl-$\Delta^5$-pregnen-3$\beta$-ol-16-one-21-oic acid methyl ester.
(23) The 3-acetate of the 20-isohexyl-$\Delta^5$-pregnen-3$\beta$-ol-16-one-21-oic acid methyl ester,
(24) The 3-acetate of the 20-(4'-methyl-pent-3'-enyl)-$\Delta^5$-pregnen-3$\beta$-ol-16-one 21-oic acid methyl ester.

*Example IX*

A solution of 5 g. of Compound No. 20 in 100 cc. of acetic acid was treated with a few drops of hydrogen bromide in acetic acid and subsequently dropwise and with stirring, with a solution of 2.2 molar equivalents of bromine in 50 cc. of acetic acid. After all the bromine had been consumed, water was added, the formed precipitate filtered, washed with water to neutral and dried under vacuum. Recrystallization from acetone-hexane yielded the 3-acetate of the 20-methyl-5$\alpha$, 6$\beta$, 17$\alpha$-tribromo-pregnan-3$\beta$-ol-16-one-21-oic acid methyl ester (Cpd. No. 25).

The Compounds Nos. 21 and 23 were treated exactly by the above procedure, Compounds Nos. 22 and 24, were treated in accordance with the above method, except that 3.3 molar equivalents of bromine were used instead of 2.2 molar equivalents, thus being respectively obtained:

Cpd. No.:

(26) The 3-acetate of the 20-ethyl-5$\alpha$,6$\beta$,17$\alpha$-tribromo-pregnan-3$\beta$-ol-16-one-21-oic-acid methyl ester,
(27) The 3-acetate of the 20-isohexyl-5$\alpha$,6$\beta$,17$\alpha$-tribromo-pregnan-3$\beta$-ol-16-one-21-oic-acid methyl ester,
(28) The 3-acetate of the 20-(1',2'-dibromoethyl)-5$\alpha$,6$\beta$,17$\alpha$-tribromo-pregnan-3$\beta$-ol-16-one-21-oic acid methyl ester,
(29) The 3-acetate of the 20-(3',4'-dibromo-4'-methylpentyl)-5$\alpha$,6$\beta$,17$\alpha$-tribromo-pregnan - 3$\beta$-ol-16-one-21-oic acid methyl ester.

*Example X*

A mixture of 2 g. of Compound No. 25, 2 g. of sodium iodide and 50 cc. of methyl ethyl ketone was refluxed for 8 hours. It was then cooled, poured into water and extracted with ethyl acetate. The organic extract was washed with aqueous sodium bisulfite solution, water, dried over anhydrous sodium sulfate and evaporated to dryness. Crystallization of the residue from acetone-hexane yielded the 3-acetate of the 20-methyl-17$\alpha$-bromo-$\Delta^5$-pregnen-3$\beta$-ol-16-one-21-oic acid methyl ester (Cpd. No. 30).

The Compounds Nos. 26 to 29, inclusive, were treated according to the same procedure, thus yielding respectively:

Cpd. No.:

(31) The 3-acetate of the 20-ethyl-17$\alpha$-bromo-$\Delta^5$-pregnen-3$\beta$-ol-16-one-21-oic acid methyl ester,

(32) The 3-acetate of the 20-isohexyl-17α-bromo-Δ5-pregnen-3β-ol-16-one-21-oic acid methyl ester,
(33) The 3-acetate of the 20-vinyl-17α-bromo-Δ5-pregnen-3β-ol-16-one-21-oic acid methyl ester,
(34) The 3-acetate of the 20-(4'-methyl-pent-3'-enyl)-17α-bromo-Δ5-pregnen-3β-ol-16-one-21-oic acid methyl ester.

*Example XI*

2 g. of Compound No. 30 in 40 cc. of cold dimethyl formamide was added over 15 minutes to a suspension of 5 g. of finely divided calcium carbonate in 15 cc. of refluxing dimethylformamide. The mixture was refluxed for 30 minutes further, cooled and filtered. The filtrate was diluted with water and extracted with ethyl acetate. The extract was washed with dilute hydrochloric acid, water, aqueous sodium bicarbonate solution and water, then dried over anhydrous sodium sulfate and evaporated to dryness. Silica gel chromatography of the residue and recrystallization of the eluted fractions afforded the 3-acetate of the 20-[cis]-methyl-Δ$^{5,17(20)}$-pregnadien-3β-ol-16-one-21-oic acid methyl ester (Cpd. No. 35) and the 3-acetate of the 20-[trans]-methyl-Δ$^{5,17(20)}$-pregnadien-3β-ol-16-one-21-oic acid methyl ester (Cpd. No. 36).

Upon treatment under exactly the above conditions,
Compound No. 31 yielded: The 3-acetate of the 20-[cis]-ethyl-Δ$^{5,17(20)}$-pregnadien-3β-ol-16-one-21-oic acid methyl ester (Cpd. No. 37) and the 3-acetate of the 20-[trans]-ethyl-Δ$^{5,17(20)}$-pregnadien-3β-ol-16-one-21-oic acid methyl ester (Cpd. No. 38);
Compound No. 32 gave: The 3-acetate of the 20-[cis]-isohexyl-Δ$^{5,17(20)}$-pregnadien-3β-ol-16-one-21-oic acid methyl ester (Cpd. No. 39) and the 3-acetate of the 20-[trans]-isohexyl-Δ$^{5,17(20)}$-pregnadien-3β-ol-16-one-21-oic acid methyl ester (Cpd. No. 40);
Compound No. 33 afforded: The 3-acetate of the 20-[cis]-vinyl-Δ$^{5,17(20)}$-pregnadien-3β-ol-16-one-21-oic acid methyl ester (Cpd. No. 41) and the 3-acetate of the 20-[trans]-vinyl-Δ$^{5,17(20)}$-pregnadien-3β-ol-16-one-21-oic acid methyl ester (Cpd. No. 42).
Compound No. 34 furnished: The 3-acetate of the 20-[cis]-(4'-methyl-pent-3'-enyl)-Δ$^{5,17(20)}$-pregnadien-3β-ol-16-one-21-oic acid methyl ester (Cpd. No. 43) and the 3-acetate of the 20-[trans]-(4'-methyl-pent-3'-enyl)-Δ$^{5,17(20)}$-pregnadien-3β-ol-16-one-21-oic acid (Cpd. No. 44).

*Example XII*

A solution of 2 g. of sodium borohydride in 30 cc. of methanol was added with stirring to a solution of 2 g. of Compound No. 35 in 40 cc. of tetrahydrofuran. The mixture was kept at room temperature for 3 hours, the excess reagent was decomposed by addition of acetic acid, the resulting solution concentrated to small volume in vacuo and diluted with water. The product was extracted with ethyl acetate, the extract washed with water, dried and evaporated. Chromatography of the residue and crystallization of the solid fractions from acetone-hexane gave the 3-acetate of the 20-[cis]-methyl-Δ$^{5,17(20)}$-pregnadiene-3β,16α-diol-21-oic acid methyl ester (Cpd. No. 45) and the 3-acetate of the 20-[cis]-methyl-Δ$^{5,17(20)}$-pregnadiene-3β,16β-diol-21-oic acid methyl ester (Cpd. No. 46).

The Compounds Nos. 36 to 44, inclusive, were treated by the above procedure, thus being respectively produced:

Cpd. No.:
(47) The 3-acetate of the 20-[trans]-methyl-Δ$^{5,17(20)}$-pregnadiene-3β,16β-diol-21-oic acid methyl ester,
(48) The 3-acetate of the 20-[trans]-methyl-Δ$^{5,17(20)}$-pregnadiene-3β,16α-diol-21-oic acid methyl ester,
(49) The 3-acetate of the 20-[cis]-ethyl-Δ$^{5,17(20)}$-pregnadiene-3β,16β-diol-21-oic acid methyl ester,
(50) The 3-acetate of the 20-[cis]-ethyl-Δ$^{5,17(20)}$-pregnadiene-3β,16α-diol-21-oic acid methyl ester,
(51) The 3-acetate of the 20-[trans]-ethyl-Δ$^{5,17(20)}$-pregnadiene-3β,16β-diol-21-oic acid methyl ester,
(52) The 3-acetate of the 20-[trans]-ethyl-Δ$^{5,17(20)}$-pregnadiene-3β,16α-diol-21-oic acid methyl ester,
(53) The 3-acetate of the 20-[cis]-isohexyl-Δ$^{5,17(20)}$-pregnadiene-3β,16β-diol-21-oic acid methyl ester,
(54) The 3-acetate of the 20-[cis]-isohexyl-Δ$^{5,17(20)}$-pregnadiene-3β,16α-diol-21-oic acid methyl ester,
(55) The 3-acetate of the 20-[trans]-isohexyl-Δ$^{5,17(20)}$-pregnadiene-3β,16β-diol-21-oic acid methyl ester,
(56) The 3-acetate of the 20-[trans]-isohexyl-Δ$^{5,17(20)}$-pregnadiene-3β,16α-diol-21-oic acid methyl ester,
(57) The 3-acetate of the 20-[cis]-vinyl-Δ$^{5,17(20)}$-pregnadiene-3β,16β-diol-21-oic acid methyl ester,
(58) The 3-acetate of the 20-[cis]-vinyl-Δ$^{5,17(20)}$-pregnadiene-3β,16α-diol-21-oic acid methyl ester,
(59) The 3-acetate of the 20-[trans]-vinyl-Δ$^{5,17(20)}$-pregnadiene-3β,16β-diol-21-oic acid methyl ester,
(60) The 3-acetate of the 20-[trans]-vinyl-Δ$^{5,17(20)}$-pregnadiene-3β,16α-diol-21-oic acid methyl ester,
(61) The 3-acetate of the 20-[cis]-(4'-methyl-pent-3'-enyl)-Δ$^{5,17(20)}$-pregnadiene-3β,16β-diol-21-oic acid methyl ester,
(62) The 3-acetate of the 20-[cis]-(4'-methyl-pent-3'-enyl)-Δ$^{5,17(20)}$-pregnadiene-3β,16α-diol-21-oic acid methyl ester,
(63) The 3-acetate of the 20-[trans]-(4'-methyl-pent-3'-enyl)-Δ$^{5,17(20)}$-pregnadiene-3β,16β-diol-21-oic acid methyl ester,
(64) The 3-acetate of the 20-[trans]-(4'-methyl-pent-3'-enyl)-Δ$^{5,17(20)}$-pregnadiene-3β,16α-diol-21-oic acid methyl ester.

*Example XIII*

2 cc. of dihydropyrane were added to a solution of 1 g. of Compound No. 45 in 15 cc. of benzene and about 1 cc. was distilled to remove moisture. 0.4 g. of p-toluenesulfonic acid were added to the cooled solution, which was then allowed to stand at room temperature for 4 days. The solution was washed with sodium carbonate and water, dried and evaporated. The residue was chromatographed on 15 g. of neutral alumina. Crystallization of the fractions eluted with hexane from pentane yielded the 3-acetate-16-tetrahydropyranylether of the 20-[cis]-methyl-Δ$^{5,17(20)}$-pregnadiene-3β,16α-diol-21-oic acid methyl ester (Cpd. No. 65).

A suspension of 1 g. of the latter compound in 60 cc. of methanol was treated with a solution of 1 g. of potassium carbonate in 6 cc. of water; the mixture was boiled under reflux for 1 hour and then cooled in ice, acidified with dilute hydrochloric acid and diluted with water. The formed precipitate was collected and recrystallized from acetone-hexane to yield the 16-tetrahydropyranylether of 20-[cis]-methyl-Δ$^{5,17(20)}$-pregnadiene-3β,16α-diol-21-oic acid (Cpd. No. 66).

A solution of 0.9 g. of Compound No. 66 in 80 cc. of toluene and 20 cc. of cyclohexanone was dried by distilling off 10 cc. of the solvent. A solution of 1 g. of aluminum isopropoxide dissolved in 7 cc. of anhydrous toluene was then added and the mixture was refluxed for 45 minutes; 4 cc. of acetic acid were added and the solvents removed by steam distillation. The product was extracted several times with ethyl acetate and the organic extracts washed with 5% hydrochloric acid solution, water, 10% sodium carbonate solution and water until neutral, dried over anhydrous sodium sulfate and evaporated to dryness. Crystallization from acetone-hexane afforded the 16-tetrahydropyranylether of 20-[cis]-methyl-Δ$^{4,17(20)}$-pregnadien-16α-ol-3-one-21-oic acid (Cpd. No. 67).

To a solution of the latter compound in 30 cc. of acetic acid was added 0.5 cc. of 2 N hydrochloric acid. After 5 hours at room temperature, ice water was added and the product extracted with methylene chloride. The extract was washed to neutral, dried over anhydrous sodium sulfate and evaporated to dryness. Crystallization from acetone-hexane yielded 20-[cis]-methyl-$\Delta^{4,17(20)}$-pregnadien-16α-ol-3-one-21-oic acid (Cpd. No. 68).

The Compounds Nos. 46 to 64, inclusive, were treated following the above procedures, thus affording successively the corresponding 16-tetrahydropyranylethers, the corresponding 16-tetrahydropyranylethers of the free 3β-ol-21-oic acids, the corresponding 16-tetrahydropyranylethers of the $\Delta^4$-3-keto-21-oic acids and finally the following respective compounds:

Cpd. No.:

(69) 20-[cis]-methyl-$\Delta^{4,17(20)}$-pregnadien-16β-ol-3-one-21-oic acid,
(70) 20-[trans]-methyl-$\Delta^{4,17(20)}$-pregnadien-16β-ol-3-one-21-oic acid,
(71) 20-[trans]-methyl-$\Delta^{4,17(20)}$-pregnadien-16α-ol-3-one-21-oic acid,
(72) 20-[cis]-ethyl-$\Delta^{4,17(20)}$-pregnadien-16β-ol-3-one-21-oic acid,
(73) 20-[cis]-ethyl-$\Delta^{4,17(20)}$-pregnadien-16α-ol-3-one-21-oic acid,
(74) 20-[trans]-ethyl-$\Delta^{4,17(20)}$-pregnadien-16β-ol-3-one-21-oic acid,
(75) 20-[trans]-ethyl-$\Delta^{4,17(20)}$-pregnadien-16α-ol-3-one-21-oic acid,
(76) 20-[cis]-isohexyl-$\Delta^{4,17(20)}$-pregnadien-16β-ol-3-one-21-oic acid,
(77) 20-[cis]-isohexyl-$\Delta^{4,17(20)}$-pregnadien-16α-ol-3-one-21-oic acid,
(78) 20-[trans]-isohexyl-$\Delta^{4,17(20)}$-pregnadien-16β-ol-3-one-21-oic acid,
(79) 20-[trans]-isohexyl-$\Delta^{4,17(20)}$-pregnadien-16α-ol-3-one-21-oic acid,
(80) 20-[cis]-vinyl-$\Delta^{4,17(20)}$-pregnadien-16β-ol-3-one-21-oic acid,
(81) 20-[cis]-vinyl-$\Delta^{4,17(20)}$-pregnadien-16α-ol-3-one-21-oic acid,
(82) 20-[trans]-vinyl-$\Delta^{4,17(20)}$-pregnadien-16β-ol-3-one-21-oic acid,
(83) 20-[trans]-vinyl-$\Delta^{4,17(20)}$-pregnadien-16α-ol-3-one-21-oic acid,
(84) 20-[cis]-(4'-methyl-pent-3'-enyl-)-$\Delta^{4,17(20)}$-pregnadien-16β-ol-3-one-21-oic acid,
(85) 20-[cis]-(4'-methyl-pent-3'-enyl)-$\Delta^{4,17(20)}$-pregnadien-16α-ol-3-one-21-oic acid,
(86) 20-[trans]-(4'-methyl-pent-3'-enyl)-$\Delta^{4,17(20)}$-pregnadien-16β-ol-3-one-21-oic acid,
(87) 20-[trans]-(4'-methyl-pent-3'-enyl)-$\Delta^{4,17(20)}$-pregnadien-16α-ol-3-one-21-oic acid,

Example XIV

A t-butanol solution containing 1.1 molar equivalents of methyl iodide was added dropwise to a boiling solution of 2 g. of Compound No. 68 in 30 cc. of t-butanol containing 1.1 g. of potassium over a period of 2.5 hours. It was then refluxed for a further 0.5 hour, cooled to room temperature, the bulk of the solvent was removed under vacuum and the product was precipitated with water. Isolation with ether gave a product which was adsorbed from 100 cc. of benzene onto 100 g. of alumina. Elution, followed by recrystallization from acetone-hexane afforded 4,20-[cis]-dimethyl-$\Delta^{4,17(20)}$-pregnadien-16α-ol-3-one-21-oic acid (Cpd. No. 88).

The Compounds Nos. 69 to 87, inclusive, were treated by the same procedure, thus yielding respectively:

Cpd. No.:

(89) 4,20-[cis]-dimethyl-$\Delta^{4,17(20)}$-pregnadien-16β-ol-3-one-21-oic acid,
(90) 4,20-[trans]-dimethyl-$\Delta^{4,17(20)}$-pregnadien-16β-ol-3-one-21-oic acid,
(91) 4,20-[trans]-dimethyl-$\Delta^{4,17(20)}$-pregnadien-16α-ol-3-one-21-oic acid,
(92) 4-methyl-20-[cis]-ethyl-$\Delta^{4,17(20)}$-pregnadien-16β-ol-3-one-21-oic acid,
(93) 4-methyl-20-[cis]-ethyl-$\Delta^{4,17(20)}$-pregnadien-16α-ol-3-one-21-oic acid,
(94) 4-methyl-20-[trans]-ethyl-$\Delta^{4,17(20)}$-pregnadien-16β-ol-3-one-21-oic acid,
(95) 4-methyl-20-[trans]-ethyl-$\Delta^{4,17(20)}$-pregnadien-16α-ol-3-one-21-oic acid,
(96) 4-methyl-20-[cis]-isohexyl-$\Delta^{4,17(20)}$-pregnadien-16β-ol-3-one-21-oic acid,
(97) 4-methyl-20-[cis]-isohexyl-$\Delta^{4,17(20)}$-pregnadien-16α-ol-3-one-21-oic acid,
(98) 4-methyl-20-[trans]-isohexyl-$\Delta^{4,17(20)}$-pregnadien-16β-ol-3-one-21-oic acid,
(99) 4-methyl-20-[trans]-isohexyl-$\Delta^{4,17(20)}$-pregnadien-16α-ol-3-one-21-oic acid,
(100) 4-methyl-20-[cis]-vinyl-$\Delta^{4,17(20)}$-pregnadien-16β-ol-3-one-21-oic acid,
(101) 4-methyl-20-[cis]-vinyl-$\Delta^{4,17(20)}$-pregnadien-16α-ol-3-one-21-oic acid,
(102) 4-methyl-20-[trans]-vinyl-$\Delta^{4,17(20)}$-pregnadien-16β-ol-3-one-21-oic acid,
(103) 4-methyl-20-[trans]-vinyl-$\Delta^{4,17(20)}$-pregnadien-16α-ol-3-one-21-oic acid,
(104) 4-methyl-20-[cis]-(4'-methyl-pent-3'-enyl)-$\Delta^{4,17(20)}$-pregnadien-16β-ol-3-one-21-oic acid,
(105) 4-methyl-20-[cis]-(4'-methyl-pent-3'-enyl)-$\Delta^{4,17(20)}$-pregnadien-16α-ol-3-one-21-oic acid,
(106) 4-methyl-20-[trans]-(4'-methyl-pent-3'-enyl)-$\Delta^{4,17(20)}$-pregnadien-16β-ol-3-one-21-oic acid,
(107) 4-methyl-20-[trans]-(4'-methyl-pent-3'-enyl)-$\Delta^{4,17(20)}$-pregnadien-16α-ol-3-one-21-oic acid,

Example XV

A suspension of 0.5 g. of 5% palladium on carbon catalyst in 50 cc. of methanol was hydrogenated for 30 minutes. A solution 2 g. of Compound No. 88 in 200 cc. of methanol was added to the catalyst and stirred under a hydrogen atmosphere until the uptake of hydrogen was 1.1 molar equivalent. After removal of the catalyst by filtration the solution was evaporated and the crude residue was purified by crystallization from methylene-chloride-hexane, thus giving 4β,20-[cis]-dimethyl-$\Delta^{17(20)}$-allopregnen-16α-ol-3-one-21-oic acid (Cpd. No. 108).

The Compounds Nos. 89 to 107, inclusive, were treated by the above procedure, thus yielding respectively:

Cpd. No.:

(109) 4β,20-[cis]-dimethyl-$\Delta^{17(20)}$-allopregnen-16β-ol-3-one-21-oic acid,
(110) 4β,20-[trans]-dimethyl-$\Delta^{17(20)}$-allopregnen-16β-ol-3-one-21-oic acid,
(111) 4β,20-[trans]-dimethyl-$\Delta^{17(20)}$-allopregnen-16α-ol-3-one-21-oic acid,
(112) 4β-methyl-20-[cis]-ethyl-$\Delta^{17(20)}$-allopregnen-16β-ol-3-one-21-oic acid,
(113) 4β-methyl-20-[cis]-ethyl-$\Delta^{17(20)}$-allopregnen-16α-ol-3-one-21-oic acid,
(114) 4β-methyl-20-[trans]-ethyl-$\Delta^{17(20)}$-allopregnen-16β-ol-3-one-21-oic acid,
(115) 4β-methyl-20-[trans]-ethyl-$\Delta^{17(20)}$-allopregnen-16α-ol-3-one-21-oic acid,
(116) 4β-methyl-20-[cis]-isohexyl-$\Delta^{17(20)}$-allopregnen-16β-ol-3-one-21-oic acid,
(117) 4β-methyl-20-[cis]-isohexyl-$\Delta^{17(20)}$-allopregnen-16α-ol-3-one-21-oic acid,
(118) 4β-methyl-20-[trans]-isohexyl-$\Delta^{17(20)}$-allopregnen-16β-ol-3-one-21-oic acid,
(119) 4β-methyl-20-[trans]-isohexyl-$\Delta^{17(20)}$-allopregnen-16α-ol-3-one-21-oic acid,
(120) 4β-methyl-20-[cis]-vinyl-$\Delta^{17(20)}$-allopregnen-16β-ol-3-one-21-oic acid,
(121) 4β-methyl-20-[cis]-vinyl-$\Delta^{17(20)}$-allopregnen-16α-ol-3-one-21-oic acid,
(122) 4β-methyl-20-[trans]-vinyl-$\Delta^{17(20)}$-allopregnen-16β-ol-3-one-21-oic acid, (123) 4β-methyl-20-[trans]-vinyl-Δ$^{17(20)}$-allopregnen-16α-ol-3-one-21-oic acid,
(124) 4β-methyl-20-[cis]-(4'-methyl-pent-3'-enyl)-Δ$^{17(20)}$-allopregnen-16β-ol-3-one-21-oic acid,
(125) 4β-methyl-20-[cis]-(4'-methyl-pent-3'-enyl)-Δ$^{17(20)}$-allopregnen-16α-ol-3-one-21-oic acid,
(126) 4β-methyl-20-[trans]-(4'-methyl-pent-3'-enyl)-Δ$^{17(20)}$-allopregnen-16β-ol-3-one-21-oic acid,
(127) 4β-methyl-20-[trans]-(4'-methyl-pent-3'-enyl)-Δ$^{17(20)}$-allopregnen-16α-ol-3-one-21-oic acid.

*Example XVI*

1 g. of Compound No. 108 was dissolved in 20 cc. of methanol containing 0.2 g. of sodium hydroxide and the mixture was kept for one and a half hours at room temperature, then poured into water acidified with hydrochloric cid and extracted with methylene chloride. Evaporation of the methylene chloride solution and crystallization of the residue from acetone-hexane yielded 4α,20-[cis]-dimethyl-Δ$^{17(20)}$-allopregnen-16α-ol-3-one - 21 - oic-acid (Cpd. No. 128).

The Compounds Nos. 109 to 127, inclusive, were treated according to the latter procedure, thus affording respectively the following compounds:

Cpd. No.:

(129) 4α,20-[cis]-dimethyl-Δ$^{17(20)}$-allopregnen-16β-ol - 3-one-21-oic acid,
(130) 4α,20[trans]-dimethyl-Δ$^{17(20)}$-allopregnen-16β - ol-3-one-21-oic acid,
(131) 4α,20-[trans]-dimethyl-Δ$^{17(20)}$-allopregnen-16α-ol-3-one-21-oic acid,
(132) 4α-methyl-20-[cis]-ethyl-Δ$^{17(20)}$-allopregnen - 16β-ol-3-one-21-oic acid,
(133) 4α-methyl-20-[cis]-ethyl-Δ$^{17(20)}$-allopregnen - 16α-ol-3-one-21-oic acid,
(134) 4α-methyl-20-[trans]-ethyl - Δ$^{17(20)}$ - allopregnen-16β-ol-3-one-21-oic acid,
(135) 4α-methyl-20-[trans]-ethyl - Δ$^{17(20)}$ - allopregnen-16α-ol-3-one-21-oic acid,
(136) 4α-methyl-20-[cis] - isohexyl - Δ$^{17(20)}$-allopregnen-16β-ol-3-one-21-oic acid,
(137) 4α-methyl-20-[cis]-isohexyl - Δ$^{17(20)}$-allopregnen-16α-ol-3-one-21-oic acid,
(138) 4α-methyl-20-[trans] - isohexyl-Δ$^{17(20)}$-allopregnen-16β-ol-3-one-21-oic acid,
(139) 4α-methyl-20-[trans]-isohexyl-Δ$^{17(20)}$ - allopregnen-16α-ol-3-one-21-oic acid,
(140) 4α - methyl - 20-[cis]-vinyl-Δ$^{17(20)}$-allopregnen-16β-ol-3-one-21-oic acid,
(141) 4α-methyl-20-[cis]-vinyl - Δ$^{17(20)}$ - allopregnen-16α-ol-3-one-21-oic acid,
(142) 4α-methyl-20-[trans]-vinyl - Δ$^{17(20)}$ - allopregnen-16β-ol-3-one-21-oic acid,
(143) 4α-methyl-20-[trans]-vinyl - Δ$^{17(20)}$ - allopregnen-16α-ol-3-one-21-oic acid,
(144) 4α-methyl-20-[cis]-(4'-methyl-pent-3'-enyl)-Δ$^{17(20)}$-allopregnen-16β-ol-3-one-21-oic acid,
(145) 4α-methyl-20-[cis]-(4'-methyl - pent - 3'-enyl)-Δ$^{17(20)}$-allopregnen-16α-ol-3-one-21-oic acid,
(146) 4α-methyl-20-[trans]-(4'-methyl - pent - 3'-enyl)-Δ$^{17(20)}$-allopregnen-16β-ol-3-one-21-oic acid,
(147) 4α-methyl-20-[trans]-(4'-methyl - pent - 3'-enyl)-Δ$^{17(20)}$-allopregnen-16α-ol-3-one-21-oic acid.

*Example XVII*

The Compound No. 128 was treated according to Example XII, thus yielding 4α,20-[cis]-dimethyl-Δ$^{17(20)}$-allopregnene-3β-16α-diol-21-oic acid (Cpd. No. 148).

The Compounds Nos. 129 to 147, inclusive, were treated following the same procedure, thus yielding respectively:

Cpd. No.:

(149) 4α,20-[cis]-dimethyl-Δ$^{17(20)}$-allopregnene - 3β,16β-diol-21-oic acid,
(150) 4α,20-[trans] - dimethyl - Δ$^{17(20)}$ - allopregnene-3β,16β-diol-21-oic acid,
(151) 4α,20-[trans]-dimethyl-Δ$^{17(20)}$-allopregnene-3β,16α-diol-21-oic acid,
(152) 4α-methyl-20-[cis]-ethyl - Δ$^{17(20)}$ - allopregnene-3β,16β-diol-21-oic acid,
(153) 4α-methyl-20-[cis] - ethyl - Δ$^{17(20)}$-allopregnene-3β,16α-diol-21-oic acid,
(154) 4α-methyl-20-[trans]-ethyl - Δ$^{17(20)}$ - allopregnene-3β,16β-diol-21-oic acid,
(155) 4α-methyl-20-[trans]-ethyl-Δ$^{17(20)}$ - allopregnene-3β,16α-diol-21-oic acid,
(156) 4α-methyl-20-[cis]-isohexyl-Δ$^{17(20)}$ - allopregnene-3β,16β-diol-21-oic acid,
(157) 4α-methyl-20-[cis]-isohexyl-Δ$^{17(20)}$ - allopregnene-3β,16α-diol-21-oic acid,
(158) 4α-methyl-20-[trans]-isohexyl-Δ$^{17(20)}$-allopregnene-3β,16β-diol-21-oic acid,
(159) 4α-methyl-20-[trans]-isohexyl-Δ$^{17(20)}$-allopregnene-3β,16α-diol-21-oic acid,
(160) 4α-methyl-20-[cis]-vinyl - Δ$^{17(20)}$ - allopregnene-3β,16β-diol-21-oic acid,
(161) 4α-methyl-20-[cis]-vinyl - Δ$^{17(20)}$ - allopregnene-3β,16α-diol-21-oic acid,
(162) 4α-methyl-20-[trans]-vinyl-Δ$^{17(20)}$ - allopregnene-3β,16β-diol-21-oic acid,
(163) 4α-methyl-20-[trans]-vinyl - Δ$^{17(20)}$ - allopregnene-3β,16α-diol-21-oic acid,
(164) 4α-methyl-20-[cis]-(4' - methyl - pent - 3'-enyl)-Δ$^{17(20)}$-allopregnene-3β,16β-diol-21-oic acid,
(165) 4α-methyl-20-[cis]-(4'-methyl-pent - 3' - enyl)-Δ$^{17(20)}$-allopregnene-3β,16α-diol-21-oic acid,
(166) 4α-methyl-20-[trans] - (4' - methyl-pent-3'-enyl)-Δ$^{17(20)}$-allopregnene-3β,16β-diol-21-oic acid,
(167) 4α-methyl-20-[trans]-(4'-methyl-pent - 3' - enyl)-Δ$^{17(20)}$-allopregnene-3β,16α-diol-21-oic acid.

*Example XVIII*

A mixture of 1 g. of Compound No. 128, ca. 10 g. of non-pyrophoric Raney nickel (about 1 to 3 months old) and 125 cc. of ethanol was refluxed for 5 hours, cooled and filtered. The filtrate was evaporated to dryness and the residue chromatographed on 40 g. of alumina. Crystallization of the eluted fractions yielded 4α,20-[cis]-dimethyl - Δ$^{17(20)}$ - allopregnene - 3α,16α-diol-21-oic acid (Cpd. No. 168).

The compounds Nos. 129 to 147, inclusive, were treated following the same procedure, thus furnishing respectively:

Cpd. No.:

(169) 4α,20 - [cis]-dimethyl-Δ$^{17(20)}$-allopregnene-3α,16β-diol-21-oic acid,
(170) 4α - 20 - [trans]-dimethyl-Δ$^{17(20)}$-allopregnene-3α,16β-diol-21-oic acid,
(171) 4α,20 - [trans] - dimethyl-Δ$^{17(20)}$-allopregnene-3α,16α-diol-21-oic acid,
(172) 4α - methyl-20-[cis]-ethyl-Δ$^{17(20)}$-allopregnene-3α,16β-diol-21-oic acid,
(173) 4α - methyl-20-[cis]-ethyl-Δ$^{17(20)}$-allopregnene-3α,16α-diol-21-oic acid,
(174) 4α - methyl - 20-[trans]-ethyl-Δ$^{17(20)}$-allopregnene-3α,16β-diol-21-oic acid,
(175) 4α - methyl - 20-[trans]-ethyl-Δ$^{17(20)}$-allopregnene-3α,16α-diol-21-oic acid,
(176) 4α - methyl-20-[cis]-isohexyl-Δ$^{17(20)}$-allopregnene-3α,16β-diol-21-oic acid,
(177) 4α - methyl-20-[cis]-isohexyl-Δ$^{17(20)}$-allopregnene-3α,16α-diol-21-oic acid,
(178) 4α - methyl - 20-[trans]-isohexyl-Δ$^{17(20)}$-allopregnene-3α,16β-diol-21-oic acid,
(179) 4α - methyl - 20-[trans]-isohexyl-Δ$^{17(20)}$-allopregnene-3α,16α-diol-21-oic acid,
(180) 4α - methyl-20-[cis]-vinyl-Δ$^{17(20)}$-allopregnene-3α,16β-diol-21-oic acid, (181) 4α - methyl-20-[cis]-vinyl-Δ$^{17(20)}$-allopregnene-3α,16α-diol-21-oic acid,
(182) 4α - methyl-20-[trans]-vinyl-Δ$^{17(20)}$-allopregnene-3α,16β-diol-21-oic acid,
(183) 4α - methyl - 20-[trans]-vinyl-Δ$^{17(20)}$-allopregnene-3α,16α-diol-21-oic acid,
(184) 4α - methyl - 20 - [cis]-(4'-methyl-pent-3'-enyl)-Δ$^{17(20)}$-allopregnene-3α,16β-diol-21-oic acid,
(185) 4α - methyl - 20 - [cis]-(4'-methyl-pent-3'-enyl)-Δ$^{17(20)}$-allopregnene-3α,16α-diol-21-oic acid,
(186) 4α - methyl - 20-[trans]-(4'-methyl-pent-3'-enyl)-Δ$^{17(20)}$-allopregnene-3α,16β-diol-21-oic acid,
(187) 4α - methyl - 20-[trans]-(4'-methyl-pent-3'-enyl)-Δ$^{17(20)}$-allopregnene-3α,16α-diol-21-oic acid.

*Example XIX*

A mixture of 1 g. of Compound No. 128, 4 cc. of pyridine and 2 cc. of caproic anhydride was kept at room temperature overnight, poured into ice water, the formed precipitate was filtered, washed with water and dried. Crystallization from acetone-hexane gave the 16-caproate of 4α,20 - [cis] - dimethyl - Δ$^{17(20)}$-allopregnen-16α-ol-3-one-21-oic acid (Cpd. No. 188).

The Compounds Nos. 148 and 168 were treated by the above procedure, thus yielding respectively: the dicaproate of 4α,20 - [cis] - dimethyl - Δ$^{17(20)}$-allopregnene-3β,16α-diol-21-oic acid (Cpd. No. 189) and the dicaproate of 4α,20 - [cis]-dimethyl-Δ$^{17(20)}$-allopregnene-3α,16α-diol-21-oic acid (Cpd. No. 190).

The Compounds Nos. 129 through 147, inclusive, were treated by the same procedure and gave the corresponding 16-caproates.

Upon treatment of the Compound Nos. 149 through 167, inclusive and 169 through 187, inclusive, by the same procedure, there were obtained the corresponding 3,16-dicaproates.

*Example XX*

The starting compounds of Example XIX were treated following exactly the procedure described in that example, except that caproic anhydride was substituted by acetic anhydride, propionic anhydride, enanthic anhydride and cyclopentylpropionic anhydride thus affording respectively the corresponding acetates, propionates, enanthates, and cyclopentylpropionates of said starting compounds.

*Example XXI*

The Compounds Nos. 128, 148 and 168 were treated according to Example VIII, thus yielding respectively:

Cpd. No.:

(191) 4α,20 - [cis] - dimethyl-Δ$^{17(20)}$-allopregnen-16α-ol-3-one-21-oic acid methyl ester,
(192) 4α,20 - [cis]-dimethyl-Δ$^{17(20)}$-allopregnene-3β,16α-diol-21-oic acid methyl ester,
(193) 4α,20 - [cis]-dimethyl-Δ$^{17(20)}$-allopregnene-3α,16α-diol-21-oic acid methyl ester.

When treating the Compounds Nos. 129 to 147, inclusive, 149 to 167, inclusive and 169 to 190, inclusive, there were obtained the corresponding methyl esters.

*Example XXII*

A solution of 1 g. of Compound No. 128 in 50 cc. of ethanol was neutralized with a 0.5 N solution of sodium hydroxide in ethanol. The mixture was evaporated to dryness under vacuum and the residue recrystallized from ethanol-water, thus yielding the sodium salt of 4α,20-[cis] - dimethyl - Δ$^{17(20)}$ - allopregnen-16α-ol-3-one-21-oic acid (Cpd. No. 194).

The Compounds Nos. 129 to 190, inclusive, were treated by the same procedure, thus affording respectively:

Cpd. No.:

(195) The sodium salt of 4α,20-[cis]-dimethyl-Δ$^{17(20)}$-allopregnen-16β-ol-3-one-21-oic acid,
(196) The sodium salt of 4α,20-[trans]-dimethyl-Δ$^{17(20)}$-allopregnen-16β-ol-3-one-21-oic acid,
(197) The sodium salt of 4α,20-[trans]-dimethyl-Δ$^{17(20)}$-allopregnen-16α-ol-3-one-21-oic acid,
(198) The sodium salt of 4α - methyl - 20 - [cis] - ethyl-Δ$^{17(20)}$-allopregnen-16β-ol-3-one-21-oic acid,
(199) The sodium salt of 4α - methyl - 20 - [cis] - ethyl-Δ$^{17(20)}$-allopregnen-16α-ol-3-one-21-oic acid,
(200) The sodium salt of 4α-methyl-20-[trans]-ethyl-Δ$^{17(20)}$-allopregnen-16β-ol-3-one-21-oic acid,
(201) The sodium salt of 4α-methyl-20-[trans]-ethyl-Δ$^{17(20)}$-allopregnen-16α-ol-3-one-21-oic acid,
(202) The sodium salt of 4α-methyl-20-[cis]-isohexyl-Δ$^{17(20)}$-allopregnen-16β-ol-3-one-21-oic acid,
(203) The sodium salt of 4α-methyl-20-[cis]-isohexyl-Δ$^{17(20)}$-allopregnen-16α-ol-3-one-21-oic acid,
(204) The sodium salt of 4α-methyl-20-[trans]-isohexyl-Δ$^{17(20)}$-allopregnen-16β-ol-3-one-21-oic acid,
(205) The sodium salt of 4α-methyl-20-[trans]-isohexyl-Δ$^{17(20)}$-allopregnen-16α-ol-3-one-21-oic acid,
(206) The sodium salt of 4α - methyl - 20 - [cis] - vinyl-Δ$^{17(20)}$-allopregnen-16β-ol-3-one-21-oic acid,
(207) The sodium salt of 4α - methyl - 20 - [cis] - vinyl-Δ$^{17(20)}$-allopregnen-16α-ol-3-one-21-oic acid,
(208) The sodium salt of 4α-methyl-20-[trans]-vinyl-Δ$^{17(20)}$-allopregnen-16β-ol-3-one-21-oic acid,
(209) The sodium salt of 4α-methyl-20-[trans]-vinyl-Δ$^{17(20)}$-allopregnen-16α-ol-3-one-21-oic acid,
(210) The sodium salt of 4α-methyl-20-[cis]-(4'-methyl-pent-3'-enyl)-Δ$^{17(20)}$ - allopregnen - 16β - ol - 3-one-21-oic acid,
(211) The sodium salt of 4α-methyl-20-[cis]-(4'-methyl-pent-3'-enyl)-Δ$^{17(20)}$ - allopregnen - 16α - ol - 3-one-21-oic acid,
(212) The sodium salt of 4α - methyl - 20 - [trans] - (4'-methyl-pent-3' - enyl) - Δ$^{17(20)}$ - allopregnen - 16β - ol-3-one 21-oic acid,
(213) The sodium salt of 4α - methyl - 20 - [trans] - (4'-methyl-pent-3'-enyl)-Δ$^{17(20)}$ - allopregnen - 16α - ol - 3-one-21-oic acid,
(214) The sodium salt of 4α,20-[cis]-dimethyl-Δ$^{17(20)}$-allopregnene-3β,16α-diol-21-oic acid,
(215) The sodium salt of 4α,20-[cis]-dimethyl-Δ$^{17(20)}$-allopregnene-3β,16β-diol-21-oic acid,
(216) The sodium salt of 4α,20-[trans]-dimethyl-Δ$^{17(20)}$-allopregnene-3β,16β-diol-21-oic acid,
(217) The sodium salt of 4α,20-[trans]-dimethyl-Δ$^{17(20)}$-allopregnene-3β,16α-diol-21-oic acid,
(218) The sodium salt of 4α - methyl - 20 - [cis] - ethyl-Δ$^{17(20)}$-allopregnene-3β,16β-diol-21-oic acid,
(219) The sodium salt of 4α - methyl - 20 - [cis] - ethyl-Δ$^{17(20)}$-allopregnene-3β,16α-diol-21-oic acid,
(220) The sodium salt of 4α-methyl-20-[trans]-ethyl-Δ$^{17(20)}$-allopregnene-3β,16β-diol-21-oic acid,
(221) The sodium salt of 4α-methyl-20-[trans]-ethyl-Δ$^{17(20)}$-allopregnene-3β,16α-diol-21-oic acid,
(222) The sodium salt of 4α-methyl-20-[cis]-isohexyl-Δ$^{17(20)}$-allopregnene-3β,16β-diol-21-oic acid,
(223) The sodium salt of 4α-methyl-20-[cis]-isohexyl-Δ$^{17(20)}$-allopregnene-3β,16α-diol-21-oic acid,
(224) The sodium salt of 4α-methyl-20-[trans]-isohexyl-Δ$^{17(20)}$-allopregnene-3β,16β-diol-21-oic acid,
(225) The sodium salt of 4α-methyl-20-[trans]-isohexyl-Δ$^{17(20)}$-allopregnene-3β,16α-diol-21-oic acid,
(226) The sodium salt of 4α - methyl - 20 - [cis] - vinyl-Δ$^{17(20)}$-allopregnene-3β,16β-diol-21-oic acid,
(227) The sodium salt of 4α - methyl - 20 - [cis] - vinyl-Δ$^{17(20)}$-allopregnene-3β,16α-diol-21-oic acid,
(228) The sodium salt of 4α-methyl-20-[trans]-vinyl-Δ$^{17(20)}$-allopregnene-3β,16β-diol-21-oic acid,
(229) The sodium salt of 4α-methyl-20-[trans]-vinyl-Δ$^{17(20)}$-allopregnene-3β,16α-diol-21-oic acid,
(230) The sodium salt of 4α-methyl-20-[cis]-(4'-methyl-pent-3'-enyl)-Δ$^{17(20)}$ - allopregnene - 3β,16β-diol-21-oic acid, (231) The sodium salt of 4α-methyl-20-[cis]-(4'-methyl-pent-3'-enyl)-Δ$^{17(20)}$ - allopregnene - 3β,16α-diol-21-oic-acid,
(232) The sodium salt of 4α - methyl - 20 - [trans] - (4'-methyl-pent-3'-enyl)-Δ$^{17(20)}$ - allopregnene-3β,16β-diol-21-oic acid,
(233) The sodium salt of 4α - methyl - 20 - [trans] - (4'-methyl-pent-3'-enyl)-Δ$^{17(20)}$ - allopregnene-3β,16α-diol-21-oic acid,
(234) The sodium salt of 4α,20-[cis]-dimethyl-Δ$^{17(20)}$-allopregnene-3α,16α-diol-21-oic acid,
(235) The sodium salt of 4α,20-[cis]-dimethyl-Δ$^{17(20)}$-allopregnene-3α,16β-diol-21-oic acid,
(236) The sodium salt of 4α,20-[trans]-dimethyl-Δ$^{17(20)}$-allopregnene-3α,16β-diol-21-oic acid,
(237) The sodium salt of 4α,20-[trans]-dimethyl-Δ$^{17(20)}$-allopregnene-3α,16α-diol-21-oic acid,
(238) The sodium salt of 4α - methyl - 20 - [cis] - ethyl-Δ$^{17(20)}$-allopregnene-3α,16β-diol-21-oic acid,
(239) The sodium salt of 4α - methyl - 20 - [cis] - ethyl-Δ$^{17(20)}$-allopregnene-3α,16α-diol-21-oic acid,
(240) The sodium salt of 4α-methyl-20-[trans]-ethyl-Δ$^{17(20)}$-allopregnene-3α,16β-diol-21-oic acid,
(241) The sodium salt of 4α-methyl-20-[trans]-ethyl-Δ$^{17(20)}$-allopregnene-3α,16α-diol-21-oic acid,
(242) The sodium salt of 4α-methyl-20-[cis]-isohexyl-Δ$^{17(20)}$-allopregnene-3α,16β-diol-21-oic acid,
(243) The sodium salt of 4α-methyl-20-[cis]-isohexyl-Δ$^{17(20)}$-allopregnene-3α,16α-diol-21-oic acid,
(244) The sodium salt of 4α-methyl-20-[trans]-isohexyl-Δ$^{17(20)}$-allopregnene-3α,16β-diol-21-oic acid,
(245) The sodium salt of 4α-methyl-20-[trans]-isohexyl-Δ$^{17(20)}$-allopregnene-3α,16α-diol-21-oic acid,
(246) The sodium salt of 4α - methyl - 20 - [cis] - vinyl-Δ$^{17(20)}$-allopregnene-3α,16β-diol-21-oic acid,
(247) The sodium salt of 4α - methyl - 20 - [cis] - vinyl-Δ$^{17(20)}$-allopregnene-3α,16α-diol-21-oic acid,
(248) The sodium salt of 4α-methyl-20-[trans]-vinyl-Δ$^{17(20)}$-allopregnene-3α,16β-diol-21-oic acid,
(249) The sodium salt of 4α-methyl-20-[trans]-vinyl-Δ$^{17(20)}$-allopregnene-3α,16α-diol-21-oic acid,
(250) The sodium salt of 4α-methyl-20-[cis]-(4'-methyl-pent-3'-enyl)-Δ$^{17(20)}$ - allopregnene - 3α,16β-diol-21-oic acid,
(251) The sodium salt of 4α-methyl-20-[cis]-(4'-methyl-pent-3'-enyl)-Δ$^{17(20)}$ - allopregnene - 3α,16α-diol-21-oic acid,
(252) The sodium salt of 4α - methyl - 20 - [trans] - (4'-methyl-pent-3'-enyl)-Δ$^{17(20)}$ - allopregnene-3α,16β-diol-21-oic acid,
(253) The sodium salt of 4α - methyl - 20 - [trans] - (4'-methyl-pent-3'-enyl)-Δ$^{17(20)}$ - allopregnene-3α,16α-diol-21-oic acid,
(254) The sodium salt of the 16-caproate of 4α,20-[cis]-dimethyl-Δ$^{17(20)}$-allopregnen-16α-ol-3-one-21-oic acid,
(255) The sodium salt of the dicaproate of 4α,20-[cis]-dimethyl-Δ$^{17(20)}$-allopregnene-3β,16α-diol-21-oic acid,
(256) The sodium salt of the dicaproate of 4α,20-[cis]-dimethyl-Δ$^{17(20)}$-allopregnene-3α,16α-diol-21-oic acid,

Example XXIII

The Compound No. 128 was treated according to Example XXII, except that potassium hydroxide was used instead of sodium hydroxide thus yielding: The potassium salt of 4α,20-[cis]-dimethyl-Δ$^{17(20)}$-allopregnen-16α-ol-3-one-21-oic acid (Cpd. No. 257).

Upon treatment of Compounds Nos. 129 to 190, inclusive, by the same procedure, there were obtained the corresponding potassium salts.

Example XXIV

The Compound No. 68 was treated according to Example XV, thus giving 20-[cis]-methyl-Δ$^{17(20)}$-allopregnen-16α-ol-3-one-21-oic acid (Cpd. No. 258).

Upon treatment of the Compounds Nos. 69 to 87, inclusive, by the same procedure, there were obtained the corresponding Δ$^{17(20)}$-allopregnene derivatives.

We claim:
1. A compound represented by the formula:

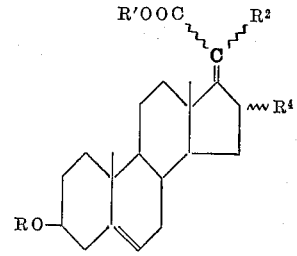

wherein R is selected from the group consisting of hydrogen and an acyl group containing less than 12 carbon atoms; $R^1$ is selected from the group consisting of hydrogen, a lower alkyl group and an alkali metal; $R^2$ is an aliphatic hydrocarbon radical containing from 1 to 8 carbon atoms, inclusive; and $R^4$ is selected from the group consisting of α-hydroxyl, β-hydroxyl, tetrahydropyranyl ethers thereof, and a keto group.

2. A compound represented by the formula:

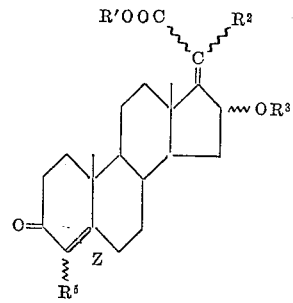

wherein $R^1$ is selected from the group consisting of hydrogen, a lower alkyl group and an alkali metal; $R^2$ is an aliphatic hydrocarbon radical containing from 1 to 8 carbon atoms, inclusive, $R^3$ is selected from the group consisting of hydrogen and an acyl group containing less than 12 carbon atoms; $R^5$ is selected from the group consisting of hydrogen and a lower alkyl group; and Z is selected from the group consisting of a single bond and a double bond at the 4,5-position.

3. A compound represented by the formula:

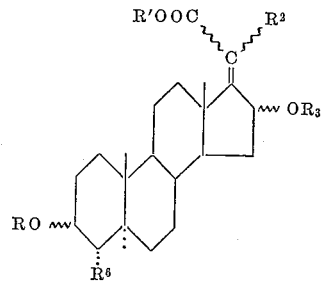

wherein R is selected from the group consisting of hydrogen and an acyl group containing less than 12 carbon atoms; $R^1$ is selected from the group consisting of hydrogen, a lower alkyl group and an alkali metal; $R^2$ is an aliphatic hydrocarbon radical containing from 1 to 8 carbon atoms, inclusive; $R^3$ is selected from the group consisting of hydrogen and an acyl group containing less than 12 carbon atoms, and $R^6$ is a lower alkyl group.

4. 4α,20-dimethyl-Δ$^{17(20)}$-allopregnene-3,16 - diol - 21-oic acid.

5. An alkali metal salt of 4α,20-dimethyl-Δ$^{17(20)}$-allopregnene-3,16-diol-21-oic acid.

6. 4α-methyl-20-ethyl-Δ$^{17(20)}$-allopregnene - 3,16 - diol-21-oic acid.

7. An alkali metal salt of 4α-methyl-20-ethyl-Δ$^{17(20)}$-allopregnene-3,16-diol-21-oic acid.

8. 4α-methyl-20-isohexyl-$\Delta^{17(20)}$-allopregnene-3,16-diol-21-oic acid.

9. An alkali metal salt of 4α-methyl-20-isohexyl-$\Delta^{17(20)}$-allopregnene-3,16-diol-21-oic acid.

10. 4α-methyl-20-vinyl-$\Delta^{17(20)}$-allopregnene-3,16-diol-21-oic acid.

11. An alkali metal salt of 4α-methyl-20-vinyl-$\Delta^{17(20)}$-allopregnene-3,16-diol-21-oic acid.

12. 4α-methyl-20-(4'-methylpent-3'-enyl)-$\Delta^{17(20)}$-allopregnene-3,16-diol-21-oic acid.

13. An alkali metal salt of 4α-methyl-20-(4'-methylpent-3'-enyl)-$\Delta^{17(20)}$-allopregnene-3,16-diol-21-oic acid.

14. 4α,20-[cis]-dimethyl-$\Delta^{17(20)}$-allopregnene-3α,16α-diol-21-oic acid.

15. An alkali metal salt of 4α,20-[cis]-dimethyl-$\Delta^{17(20)}$-allopregnene-3α,16α-diol-21-oic acid.

16. The sodium salt of 4α,20-[cis]-dimethyl-$\Delta^{17(20)}$-allopregnene-3α,16α-diol-21-oic acid.

17. 4α-methyl-20-[cis]-ethyl-$\Delta^{17(20)}$-allopregnene-3α,16α-diol-21-oic acid.

18. 4α-methyl-20-[cis]-isohexyl-$\Delta^{17(20)}$-allopregnene-3α,16α-diol-21-oic acid.

19. 4α-methyl-20-[cis]-vinyl-$\Delta^{17(20)}$-allopregnene-3α,16α-diol-21-oic acid.

20. 4α-methyl-20-[cis]-(4'-methylpent-3'-enyl)-$\Delta^{17(20)}$-allopregnene-3α,16α-diol-21-oic acid.

No references cited.